US011806777B2

(12) United States Patent
Inoie et al.

(10) Patent No.: US 11,806,777 B2
(45) Date of Patent: Nov. 7, 2023

(54) MATERIAL FOR MOLDING, FUNCTIONAL AGENT, MOLDED PRODUCT, AND PRODUCT

(71) Applicant: AGC CERAMICS CO., LTD., Minato-ku (JP)

(72) Inventors: Shohachi Inoie, Ishikawa (JP); Hiroshi Inoie, Ishikawa (JP); Miki Inoie, Ishikawa (JP); Yukihiro Ushimaru, Hyogo (JP)

(73) Assignee: AGC CERAMICS CO., LTD., Minato-ku (JP)

( * ) Notice: Subject to any disclaimer, the term of this patent is extended or adjusted under 35 U.S.C. 154(b) by 187 days.

(21) Appl. No.: 16/684,679

(22) Filed: Nov. 15, 2019

(65) Prior Publication Data
US 2020/0078856 A1 Mar. 12, 2020

Related U.S. Application Data

(63) Continuation of application No. PCT/JP2018/019205, filed on May 17, 2018.

(30) Foreign Application Priority Data
May 19, 2017 (JP) ................. 2017-099883

(51) Int. Cl.
C04B 28/10 (2006.01)
B22C 9/02 (2006.01)
B22C 1/18 (2006.01)
C04B 111/00 (2006.01)

(52) U.S. Cl.
CPC ............ B22C 9/02 (2013.01); B22C 1/181 (2013.01); C04B 28/105 (2013.01); C04B 2111/00181 (2013.01)

(58) Field of Classification Search
CPC . C04B 14/303; C04B 14/306; C04B 40/0608; C04B 28/02; C04B 28/06; C04B 14/304; C04B 18/146; C04B 20/008; C04B 2103/14; C04B 2103/465; C04B 2103/50; C04B 22/10; C04B 24/2623; C04B 2111/00181; C04B 2111/0087; C04B 2111/00939; C04B 28/04; C04B 28/105; C04B 28/26; C04B 28/34; B22C 1/181; B22C 9/02; B28B 1/30; Y02W 30/91; B33Y 10/00; B33Y 30/00; B33Y 70/00; B33Y 80/00
See application file for complete search history.

(56) References Cited

U.S. PATENT DOCUMENTS

| 5,902,441 A | 5/1999 | Bredt et al. |
| 6,416,850 B1 | 7/2002 | Bredt et al. |
| 2002/0026982 A1 | 3/2002 | Bredt et al. |
| 2004/0138336 A1 | 7/2004 | Bredt et al. |
| 2008/0274374 A1 | 11/2008 | Ina |
| 2008/0302276 A1* | 12/2008 | Perez-Pena ............. C04B 28/04 106/690 |
| 2017/0030647 A1* | 2/2017 | Hershey ................ C04B 14/305 |

FOREIGN PATENT DOCUMENTS

| CN | 103167918 A | 6/2013 | |
| JP | 2002-528375 A | 9/2002 | |
| JP | 2006-247743 A | 9/2006 | |
| JP | 2010-110802 A | 5/2010 | |
| JP | 2013-053059 A | 3/2013 | |
| JP | 2013053059 A * | 3/2013 | |
| JP | 5318301 B1 * | 10/2013 | ............. B22C 1/181 |
| JP | 2016-117069 A | 6/2016 | |
| JP | 2016117069 A * | 6/2016 | |
| WO | WO 2013/054833 A1 | 4/2013 | |

OTHER PUBLICATIONS

International Search Report dated Jul. 17, 2018 in PCT/JP2018/019205 filed on May 17, 2018 (with English Translation).
Written Opinion dated Jul. 17, 2018 in PCT/JP2018/019205 filed on May 17, 2018.

* cited by examiner

*Primary Examiner* — Shuangyi Abu Ali
(74) *Attorney, Agent, or Firm* — Oblon, McClelland, Maier & Neustadt, L.L.P.

(57) ABSTRACT

A molding material in a powder-fixing lamination method includes an aggregate and a powdery precursor of a binder that binds the aggregate mutually. The aggregate is a casting sand, and the powdery precursor contains a hardening component and a hardening accelerating component. A molded product is manufactured using the molding material.

13 Claims, No Drawings

MATERIAL FOR MOLDING, FUNCTIONAL AGENT, MOLDED PRODUCT, AND PRODUCT

TECHNICAL FIELD

The present invention relates to a molding material, a functional agent, a molded product, and a product, and particularly relates to a molding material, a functional agent, a molded product, and a product in a powder-fixing lamination method.

BACKGROUND ART

Conventionally, there is a method of forming a cross-sectional portion of a three-dimensional product and collecting the respective cross-sectional areas in the layer direction to manufacture a casting mold. In this method, each cross-sectional area is formed using an ink-jet print head from which an aqueous fluid is supplied to a particulate material containing a casting sand and a plaster containing a large amount of mineral gypsum that functions as a binder thereof. This kind of casting mold-manufacturing method is referred to as a powder-fixing lamination method (Patent Literature 1).

CITATION LIST

Patent Literature

Patent Literature 1: JP 2002-528375 A

SUMMARY OF INVENTION

Technical Problem

Here, when the gypsum is heated at a temperature of about 1,000° C., calcium sulfate being a main component of gypsum is thermally decomposed to generate sulfurous acid gas. Therefore, in contrast to the technique disclosed in Patent Literature 1, in the case where a material having a melting point exceeding 1,000° C. (for example, a high-melting-point metal) is used as a casting material, the pouring temperature exceeds 1,400° C. and, when the molten metal comes into contact with a casting mold, the casting mold is overheated and sulfurous acid gas or the like is generated. As a result, defects such as air-bubble cavities occur in a casting. Therefore, practically, a casting material that can be used for a casting mold manufactured using gypsum is a limited metal material which is a low-melting-point metal and has a pouring temperature of about 1,000° C. or less.

Accordingly, an object of the present invention is to provide a molding material in a powder-fixing lamination method into which even a high melting point metal having a molten metal temperature exceeding 1,400° C. can be poured, and a molded product (for example, a casting mold) manufactured using the molding material and furthermore a product (for example, a casting) manufactured using the molded product as a mold.

Solution to Problem

In order to solve the above problems, the present invention is directed to a molding material in a powder-fixing lamination method, which includes an aggregate and a powdery precursor of a binder that binds the aggregate mutually, the aggregate being a casting sand and the powdery precursor containing a hardening component and a hardening accelerating component.

That is, according to an embodiment of the present invention, even when a high-melting-point metal or the like having a molten metal temperature exceeding 1400° C. is poured, the production of a molded product that can withstand the temperature is made possible by adopting a hardening component instead of gypsum and a hardening accelerating component that contributes to quick curing.

In an embodiment of the present invention, the powdery precursor may contain, as a hardening component, at least one of a portland cement, an alumina cement, a quick-hardening cement, a phosphate cement, a water glass, a phosphate compound, a metal alkoxide material, a sulfate such as an aluminum sulfate and a magnesium sulfate, and a chloride including a polyaluminum chloride and/or may contain, as a functional component, a silica fume, a magnesia ultrafine powder and/or a heat-resistant resin. The hardening accelerating component is not particularly limited as long as it has a function of accelerating the hardening of the hardening component. As the hardening accelerating component, a lithium salt or quicklime is preferable. Examples of the lithium salt include lithium carbonate, lithium hydrogen carbonate, lithium nitrate, lithium sulfate, lithium phosphate, and lithium oxalate, and these can be used alone or in combination. Lithium carbonate is preferable from the standpoints of availability, stability, and the like.

Moreover, the casting sand in an embodiment of the present invention may contain, as chemical components, $ZrO_2$ and/or $Al_2O_3$ in an amount of 75 to 97% by weight and $SiO_2$ in an amount of 2 to 25% by weight.

In addition, the functional agent in an embodiment of the present invention can be used together with the molding material and converts the powdery precursor into a binder, and further may contain at least one of a preservative, an antifoaming agent, and a desiccant.

A molded product (for example, a casting mold) manufactured using the molding material in one embodiment of the present invention and a product (for example, a casting) manufactured using the molded product as a mold are also included in the technical scope of the present invention.

DESCRIPTION OF EMBODIMENTS

Hereinafter, embodiments of the present invention are described. The molding material and the functional agent of the present embodiment are used in a rapid prototype three-dimensional shaped object manufacturing apparatus that employs a powder-fixing lamination method. As the three-dimensional shaped object manufacturing apparatus, for example, Spectrum Z310-3D Printer manufactured by 3D Systems, Inc. or SCM-800 manufactured by CMET Inc. can be used.

1. Molding Material

The molding material of the present embodiment can be suitably used in the powder-fixing lamination method. The molding material includes an aggregate having an average diameter of 5 μm to 200 μm. It is unnecessary to control the average diameter of the aggregate in this range, but an aggregate having a size falling within this range has an advantage that additive manufacturing can be appropriately realized. When the average diameter of the molding material is too large, the surface roughness of the molded article may increase and hence there is a possibility that it becomes difficult to obtain a precise shaped body. On the other hand, when the average diameter of the molding material is too small, the fluidity of the aggregate may deteriorate, and there may occur problems, for example, a problem that proper discharge of a required amount becomes difficult. From such a viewpoint, the average diameter of the molding material is desirably 10 μm to 100 μm, and more desirably 20 μm to 75 μm. In the present description, the average diameter means a value measured by a laser diffraction-type particle size analyzer.

In the case where a casting mold is manufactured using the molding material of the present embodiment, employing a casting sand as the aggregate is conceivable. In consideration of the quality of the casting surface and the permeability of a gas generated when pouring a molten metal, the average diameter of the casting sand is preferably 20 μm to 75 μm.

From the standpoint of components, the casting sand may be a natural casting sand or an artificial casting sand such as ceramics. However, artificial casting sand is preferable in view of little variation in the average diameter and attainment of low thermal expansion and high filling property of the powdery precursor. In particular, since the artificial casting sand is nearly spherical, the effect that it can be easily mixed with the following powdery precursor is obtained.

Of course, even the natural casting sand may be used after screening it using a sieve having a mesh size of 10 μm to 90 μm, preferably 20 μm to 70 μm to obtain only those having a desired particle diameter. In addition, regarding the shape, one that has been screened using a sieve has an effect of being easily mixed with the following powdery precursor due to the stone wall effect when one having various shapes is used. In addition, the natural casting sand is generally inexpensive. Therefore, natural casting sands and artificial casting sands may be properly used depending on the purpose of the casting.

Moreover, as the casting sand, not only fresh sand but also recycled sand may be used. When casting sands having various particle sizes are used, the effect that it is easy to mix it with the following powdery precursor due to the stone wall effect is obtained. Therefore, from this viewpoint, it is preferable to broaden the particle size distribution and, for this purpose, it is another way to use mixed sand of fresh sand and recycled sand. In addition, it is possible to use mixed sand of natural casting sand and artificial casting sand.

As the casting sand suitably used in the present embodiment, examples thereof include, as commercially available products, FINE-Bz (manufactured by AGC Ceramics Co., Ltd.), Lunamos (manufactured by Kao Quaker Co., Ltd.), AR SAND (manufactured by Gun Ei Chemical Industry Co., Ltd.), NAIGI SERABEADS (Itochu Ceratech Corp.), zircon sand, chromite sand, ESPEARL (manufactured by Yamakawa Sangyo Co., Ltd.), spherical silica, silica sand processed to have a spherical shape, and the like.

Since the casting sand is used for casting uses where production is performed through solidification of a high-temperature melt, it is desired that the casting sand has higher fire resistance and thermal conductivity. From this viewpoint, it can be said that FINE-Bz, which is composed of corundum and has a high alumina content and high purity, is most suitable. Also, FINE-Bz is composed of refractory particles having high fire resistance and high thermal conductivity and containing, as chemical components, $ZrO_2$ and/or $Al_2O_3$ in an amount of 75 to 97% by weight and $SiO_2$ in an amount of 2 to 25% by weight. Since FINE-Bz is composed of spherical particles produced by melting and quenching methods and has a smooth surface, it also has an advantage of having high molding strength.

Moreover, the molding material of the present embodiment includes a powdery precursor containing at least a hardening component and a hardening accelerating component such as lithium carbonate. The powdery precursor may be, for example, a mixture of a relatively large amount of a hardening component such as alumina cement and a relatively small amount of a hardening accelerating component such as lithium carbonate ($Li_2CO_3$). Here, the relatively small amount is preferably 0.05% by weight or more, more preferably 0.1% by weight or more, and further preferably 0.5% by weight or more, relative to the whole molding material. On the other hand, it is preferably 6% by weight or less, more preferably 4% by weight or less, and further preferably 2% by weight or less, relative to the whole molding material. For example, the relatively small amount refers to the case of about 0.05 to 6% by weight. The relatively large amount is preferably 7% by weight or more, more preferably 10% by weight or more, and further preferably 12% by weight or more, relative to the whole molding material. On the other hand, it is preferably 30% by weight or less, more preferably 25% by weight or less, and further preferably 18% by weight or less, relative to the whole molding material.

Further, as the powdery precursor, an example which uses lithium carbonate as a hardening accelerating component and contains alumina cement as a hardening component is exemplified here, but a hardening component is not necessarily limited to alumina cement. Examples of the hardening component other than alumina cement include various cement materials such as portland cement, quick-hardening cement, and phosphate cement, phosphate compounds, water glass, metal alkoxide materials used in ceramic manufacturing methods by a sol-gel method, sulfate such as aluminum sulfate and magnesia sulfate, and chlorides including polyaluminum chloride, and these can be used alone or as a mixture of them including alumina cement.

The powdery precursor may further contain various functional components in order to impart functionality such as heat resistance and strength. As the functional component, examples thereof include silica fume, magnesia ultrafine powder (average diameter of 10 μm or less), and a resin material having heat resistance.

Furthermore, the heat resistance herein refers to, with regard to the production of a casting, one which satisfies the requirement that, when a casting material is poured into a casting mold, a required shell is formed at the contact surface between the casting material and the casting mold. Therefore, it should be noted that the melting point of the powdery precursor need not necessarily exceed 1,400° C.

Here, the powdery precursor is additionally described. First, from the viewpoint of preventing gas defects, it is preferable to use cement containing no gypsum component. A typical example of this kind of cement is alumina cement. Alumina cement is preferable because it also has advantages such as heat resistance as described above. However, the alumina cement existing at the time of filing of the present application is inferior to other quick-hardening cement in terms of hardening speed.

On the other hand, there is also a need to improve the resolution of the casting surface. For this reason, the present inventors have intended to use cement excellent in quick hardening, and they have tried to find a desired cement in the past.

However, cement containing a gypsum component cannot avoid the occurrence of some gas defects and, although it can be said that a remarkable effect is obtained as compared with the prior art, there is still a room for improvement.

From the above considerations, in the present embodiment, as a powder precursor, there should be used one that satisfies the requirements of absence of any gypsum content and excellence in quick hardening, in addition to heat resistance. However, such one does not exist at the time of filing the present application.

The present inventors have found that it is preferable to use alumina cement having no gypsum component in order to further prevent the occurrence of the gas defects. Namely, it is found that the powdery precursor in the present embodiment exhibits quick hardening and has heat resistance owing to the use of a mixture of a hardening accelerating component such as lithium carbonate with the hardening component, and a molding material that can remarkably prevent the gas defects can be provided.

In cement, the larger the Blaine specific surface area value is, the smaller the particle size of the cement is, the more the hydration reaction is easily accelerated, and the more the amount of bleeding is reduced. Moreover, the larger the Blaine specific surface area value is, the larger the initial strength is. Therefore, in the present embodiment, it can be said that it is more preferable to adopt a cement having a larger Blaine specific surface area value. For example, a portland cement has a Blaine specific surface area value of about 2,500 $cm^2/g$, a quick-hardening cement has a Blain specific surface area value of about 4,000 $cm^2/g$, and an alumina cement has a Blaine specific surface area value of about 4,600 $cm^2/g$. The Blaine specific surface area value is measured using a plain air permeation device defined in JIS R5201.

For these reasons, it can be said that it is most preferable to employ the alumina cement among these examples, but it should be noted that the use of cement such as quick-hardening cement or portland cement is not excluded.

Furthermore, various adjusting agents may be mixed in the molding material. As the adjusting agent herein, for example, as is described later, examples thereof include one that inhibits the permeation of surplus of a functional agent around the position to be sprayed, when the functional agent is sprayed to the molding material. When this kind of adjusting agent is used, the resolution of a casting mold can be improved, and as a result, the quality of the casting surface can be improved.

Moreover, when this kind of adjusting agent is used, depending on the kind of the functional agent, the gas generated during pouring of the molten metal can be reduced due to the presence of the surplus thereof. Therefore, it becomes possible to prevent the gas defects. The adjusting agent may be selected depending on the kind of the casting sand or the powdery precursor.

For example, in the case where the powdery precursor is cement, water is used as the functional agent main body. In this case, as the adjusting agent, sodium silicate, polyvinyl alcohol (PVA), carboxymethyl cellulose (CMC), dextrin, or a mixture thereof may be blended. The surplus of the water that is a functional agent main body is absorbed by sodium silicate or the like. The blending ratio of the adjusting agent may be suitably selected depending on the size of the particle of the casting sand.

The mixing ratio of the casting sand to the powder precursor is exemplified as follows: the ratio of the casting sand:the powder precursor is preferably approximately 65 to 95% by weight:5 to 35% by weight. For example, in the case where Lunamos (trade name) manufactured by Kao-Quaker Co., Ltd. is used as the casting sand and alumina cement (hardening component) and lithium carbonate (hardening accelerating component) are used as the powder precursor, the casting sand (Lunamos) and the powdery precursor (alumina cement+lithium carbonate) may be generally mixed at a ratio of 65% to 75% by weight:25 to 35% by weight. When FINE-Bz (trade name) from AGC Ceramics Co., Ltd. is used as the casting sand and alumina cement (hardening component) and lithium carbonate (hardening accelerating component) are used as the powder precursor, the casting sand (FINE-Bz) and the powdery precursor (alumina cement+lithium carbonate) may be generally mixed at a ratio of 80 to 95% by weight:5 to 20% by weight.

Moreover, in the case where the adjusting agent is included in the molding material, the mixing ratio of the hardening component, the hardening accelerating component, and the adjusting agent constituting the powdery precursor depends on these component conditions, but it is generally preferable that the ratio of the hardening component is 5 to 35% by weight, the ratio of the hardening accelerating component is 0.1 to 6% by weight, and the ratio of the adjusting agent is 1 to 5% by weight, each relative to the whole molding material. In this case, the ratio of the casting sand is preferably 54 to 93.9% by weight. In the case where the hardening component constituting the powdery precursor is alumina cement and the hardening accelerating component is lithium carbonate, the mixing ratio of the alumina cement and lithium carbonate to the adjusting agent depends on these component conditions, but generally, it is preferable that the ratio of alumina cement is 5 to 30% by weight, the ratio of lithium carbonate is 0.1 to 5% by weight, and the ratio of the adjusting agent is 1 to 4% by weight, each relative to the whole molding material. In this case, the ratio of the casting sand is preferably controlled to 61 to 93.9% by weight. As versatile one exemplified, in the case of using Asahi Alumina Cement No. 1 from AGC Ceramics as alumina cement and using Lithium Carbonate from Kishida Chemical Co., Ltd. or Honjo Chemical as lithium carbonate, generally, the mixing ratio of alumina cement, lithium carbonate, and the adjusting agent may be suitably controlled to 5 to 25% by weight, 0.1 to 3% by weight, and 1 to 3% by weight, respectively, relative to the whole molding material. In this case, the ratio of the casting sand is preferably controlled to 69 to 93.9% by weight.

Some organic substances are also included in the above examples of the adjusting agent but, since the organic substances cause generation of gas, in the case of using each organic substance as the adjusting agent, the ratio thereof should not exceed 2% by weight relative to the whole molding material.

The manufacturing method of the molding material is not limited, and it is merely necessary to sufficiently stir the aggregate, the powdery precursor, and the adjusting agent. Therefore, for example, in the case of manufacturing about 100 kg of a molding material, it is appropriate that about 68.0 kg of the aggregate, about 29.0 kg of the powder precursor, and about 1.0 kg of the adjusting agent are prepared and they are just set in a stirring device and then suitably stirred.

2. Functional Agent

The functional agent of the present embodiment may be one which converts the powdery precursor into a binder so that the casting sand in the molding material is mutually bound. Therefore, the functional agent may be, for example, one containing water in the case where cement is used as the powdery precursor, or one that cures a resin in the case of using the resin (for example, an aqueous resin curing agent). In the case of using the resin, instead of spraying the aqueous resin curing agent or the like from a nozzle, energy for resin curing (for example, heat or ultraviolet rays) may be added.

Here, in the case where cement is used as the powdery precursor, in principle, only water may be used as a functional agent for the transformation into a binder. However, owing to friction between water and a spraying means (nozzle head), the spraying means may generate heat. The same problem may occur in the case of using the already mentioned various ceramic-based materials as the powdery precursor. Therefore, in order to cope with this heat generation, the functional agent may be mixed with a preventing agent that prevents temperature rise and/or a surfactant that adjusts the surface tension of the functional agent itself.

The mixing ratio of the preventing agent and/or surfactant to the functional agent main body is preferably 90 to 95% by volume of the functional agent, 4 to 10% by volume of the preventing agent, and 1 to 2% by volume of the surfactant. For example, in the case where cement is used as the powdery precursor and Cartridge Hp11 from Hewlett-Packard Company is used as the spraying means, it is suitable that the ratio of water as the functional agent main body is controlled to 90% to 95% by volume (for example, 94% by volume), the ratio of glycerin as the preventing agent is controlled to 4 to 10% by volume (for example, 5% by volume), and the ratio of the surfactant is controlled to 1 to 2% by volume (for example, 1% by volume). Furthermore, the functional agent may optionally contain a preservative, an antifoaming agent, a desiccant and the like in consideration of storability and workability. In that case, each of them may be added so that the amount thereof may become 5% by volume or less in the functional agent.

As described above, in the present embodiment, a powdery precursor that replaces gypsum is selected to constitute a molding material in a powder-fixing lamination method. For this reason, even when a high-melting-point metal having a melting point exceeding 1,400° C. is poured, it becomes possible to obtain a casting mold that can withstand that temperature.

For forming a molded article such as a casting mold, there is an advantage that the strength of the molded article can be improved or hot water can be prevented from permeating into unnecessary places by impregnating the article with colloidal silica or the like under reduced pressure in a vacuum tank or the like. In the case of impregnating the article with colloidal silica, it is preferable to fire the article at 400 to 1200° C. after the impregnation.

In the present embodiment, the case of manufacturing a casting mold is mainly described as an example. However, not only the casting mold but also other molds, for example, molding molds using a flowable curable material, such as resin-based molds, glass-based molds, or rubber-based molds can also be manufactured.

EXAMPLES

Hereinafter, the molding materials in Examples of the present invention are described. The molding materials in Examples 1 to 4 are those in which the ratio of casting sand to lithium carbonate is mutually changed. Moreover, the molding materials in Examples 5 to 7 are those in which the kind of lithium carbonate is mutually changed. Furthermore, the molding materials in Examples 8 to 12 are those in which the kind of aggregate is changed from the aggregate in Examples 1 to 7 and the ratio of casting sand to lithium carbonate is changed. In addition, the molding materials in Examples 13 to 16 are those in which the kind of aggregate and the kind of hardening component in the powder precursor are changed from those in Example 1 and the ratio of the casting sand to the hardening component in the powder precursor is changed. The hardening results for individual Examples and Comparative Example are average values of multiple times of each measurement.

Example 1

The molding material in Example 1 was manufactured by sufficiently stirring the following components.

Aggregate (casting sand): about 70.0% by weight of Lunamos manufactured by Kao Quaker Co., Ltd.

Alumina cement in powder precursor: about 28.0% by weight of Asahi Alumina Cement No. 1

Lithium carbonate in powder precursor: about 1.0% by weight of Lithium Carbonate (special grade, 500 g) manufactured by Kishida Chemical Co., Ltd.

Adjusting agent: about 1.0% by weight of Gohsenol manufactured by Nippon Synthetic Chemical Industry Co., Ltd.

Comparative Example 1

The molding material in Comparative Example 1 was manufactured by sufficiently stirring the following components.

Aggregate (casting sand): about 71.0% by weight of Lunamos manufactured by Kao Quaker Co., Ltd.

Alumina cement in powder precursor: about 28.0% by weight of Asahi Alumina Cement No. 1

Lithium carbonate in powder precursor: None

Adjusting agent: about 1.0% by weight of Gohsenol manufactured by Nippon Synthetic Chemical Industry Co., Ltd.

The molding material in Example 1 was placed in a petri dish, 5 ml of water was dropped thereto drop by drop spontaneously from a pipette while opening the upper part of the pipette, and the hardening effect was verified, then the following results were obtained.

Time of water permeation into molding material: about 30 seconds

Hardening start time of molding material: about 3 minutes

Hardness after hardening start of molding material (measured by hardness meter NK-403 from Nakayama, the same applies hereinafter):

10 minutes later; about 90

30 minutes later; about 95

90 minutes later; about 95

Weight of hardened portion of molding material: about 35 g

Thickness of hardened portion of molding material: about 6.5 mm

Volume of hardened portion of molding material: about 14.9 $cm^3$

Here, the time of the water permeation into the molding material is preferably several tens of seconds to several minutes. The time of water permeation into the molding material was determined by measuring the time until the water droplets visually disappeared from the material surface after completion of the dropping. Also, the hardening start time of the molding material is the time when it can be judged that the material starts to change toward solidification and is clearly not a powder when a hardening effect measurement target is pushed with a bamboo skewer. Regarding the hardness after the hardening start of the molding material, generally, it is preferable that the hardness becomes 90 or more at an early stage after water permeates into the alumina cement and the hardening is started. The reason for the hardness of 90 or more is attributable to the viewpoint of easy handling of the hardened molding material.

Moreover, the thickness of the hardened portion of the molding material is preferably about 7.5 mm or less, and more preferably about 7.0 mm or less. Although the weight of the hardened portion of the molding material depends on the mixing ratio of the aggregate to the alumina cement, it falls within the range of about 20 g to about 40 g when the material is corresponded to a molding material which is a genuine product of Spectrum Z310-3D Printer from 3D Systems, Inc. The volume of the hardened portion of the molding material also preferably falls within the range of about 9.0 cm$^3$ to about 18.0 cm$^3$. The molding material in each Example and each Comparative Example satisfies all of these numerical values for the weight and volume of the hardened portion of the molding material. The thickness, weight, and volume of the hardened portion were measured as follows after water was dropped and the whole was allowed to stand for 5 hours or longer and sufficiently hardened. The thickness was measured visually by applying a ruler, the weight was measured by weighing the hardened part, and the volume was calculated by measuring the volume of the (non-hardened) remaining portion after removing the hardened portion and subtracting the volume from the filling volume before hardening.

The molding material in Example 1 takes about 3 minutes until hardening start and can achieve a hardness of about 90 after 10 minutes from the start, and the weight, thickness, and volume of the hardened portion of the molding material satisfy the above corresponding requirements, so that the material can be evaluated to be a good molding material.

On the other hand, the molding material in Comparative Example 1 was placed in a petri dish, water was dropped thereto in the same manner as in Example 1, and the hardening effect was verified, then the following results were obtained.

Time of water permeation into molding material: about 30 seconds

Hardening start time of molding material after dropping of water: about 17.5 minutes Hardness after hardening start of molding material:
10 minutes later; not hardened
30 minutes later; about 75
90 minutes later; about 90

Weight of hardened portion of molding material: about 34.5 g

Thickness of hardened portion of molding material: about 6.2 mm

Volume of hardened portion of molding material: about 14.5 cm$^3$

In the molding material in Comparative Example 1, the weight, thickness, and volume of the hardened portion of the molding material satisfied the above corresponding requirements, but it took about 17.5 minutes until the hardening starts, and a hardness of about 90 could be achieved only after 90 minutes from the start.

Moreover, when the molding material in Example 1 and the molding material in Comparative Example 1 are compared, it is found that, in the molding material in Example 1, the hardening start time of the molding material after the dropping of water is shortened to about ⅙ and the time for obtaining a hardness of about 90 is shortened to about ⅑.

Example 2

The molding material in Example 2 is manufactured while reducing the amount of aggregate by about 0.5% by weight and increasing the amount of lithium carbonate in the powder precursor by about 0.5% by weight, as compared with the molding material in Example 1. The other conditions are the same as in the case of Example 1.

Water was dropped in the same manner as in Example 1 and the hardening effect was verified, then the following results were obtained.

Time of water permeation into molding material: about 30 seconds

Hardness after hardening start of molding material: about 3 minutes
10 minutes later; about 90
30 minutes later; about 95
90 minutes later; about 95

Weight of hardened portion of molding material: about 35.5 g

Thickness of hardened portion of molding material: about 5.5 mm

Volume of hardened portion of molding material: about 15.2 cm$^3$

The molding material in Example 2 takes about 3 minutes until hardening start and can achieve a hardness of about 90 after 10 minutes from the start, and the weight, thickness, and volume of the hardened portion of the molding material satisfy the above corresponding requirements, so that the material can be evaluated to be a good molding material.

Moreover, when the molding material in Example 2 and the molding material in Comparative Example 1 are compared, it is found that, in the molding material in Example 2, the hardening start time of the molding material after the dropping of water is shortened to about ⅙ and the time for obtaining a hardness of about 90 is shortened to about ⅑.

Example 3

The molding material in Example 3 is manufactured while reducing the amount of the aggregate by about 2.0% by weight and increasing the amount of lithium carbonate in the powder precursor by about 2.0% by weight, as compared with the molding material in Example 1. The other conditions are the same as in the case of Example 1.

Water was dropped in the same manner as in Example 1 and the hardening effect was verified, then the following results were obtained.

Time of water permeation into molding material: about 45 seconds

Hardness after hardening start of molding material: about 2.5 minutes
10 minutes later; about 90
30 minutes later; about 95
90 minutes later; about 95

Weight of hardened portion of molding material: about 36.5 g

Thickness of hardened portion of molding material: about 6.0 mm

Volume of hardened portion of molding material: about 15.7 cm$^3$

The molding material in Example 3 takes about 2.5 minutes until hardening start and can achieve a hardness of about 90 after 10 minutes from the start, and the weight, thickness, and volume of the hardened portion of the molding material satisfy the above corresponding requirements, so that the material can be evaluated to be a good molding material.

Moreover, when the molding material in Example 3 and the molding material in Comparative Example 1 are compared, it is found that, in the molding material in Example 3, the hardening start time of the molding material after the dropping of water is shortened to about ⅐ and the time for obtaining a hardness of about 90 is shortened to about ⅑.

Example 4

The molding material in Example 4 is manufactured while reducing the amount of the aggregate by about 5.0% by weight and increasing the amount of lithium carbonate in the powder precursor by about 5.0% by weight, as compared with the molding material in Example 1. The other conditions are the same as in the case of Example 1.

Water was dropped in the same manner as in Example 1 and the hardening effect was verified, then the following results were obtained.

Time of water permeation into molding material: about 45 seconds

Hardness after hardening start of molding material: about 2.2 minutes
 10 minutes later; about 90
 30 minutes later; about 95
 90 minutes later; about 95

Weight of hardened portion of molding material: about 34.0 g

Thickness of hardened portion of molding material: about 6.0 mm

Volume of hardened portion of molding material: about 14.5 cm$^3$

The molding material in Example 4 takes about 2.2 minutes until hardening start and can achieve a hardness of about 90 after 10 minutes from the start, and the weight, thickness, and volume of the hardened portion of the molding material satisfy the above corresponding requirements, so that the material can be evaluated to be a good molding material.

Moreover, when the molding material in Example 4 and the molding material in Comparative Example 1 are compared, it is found that, in the molding material in Example 4, the hardening start time of the molding material after dropping water is shortened to about ⅛ and the time for obtaining a hardness of about 90 is shortened to about ⅑.

When the consideration results of the hardening effects of Examples 1 to 4 are summarized, it is found that the desired hardness can be obtained by mixing only about 1.0% by weight of lithium carbonate as in the molding material in Example 1. Moreover, even when the mixing amount of lithium carbonate is about 6.0% by weight as in Example 4, desired hardening results are obtained, and thus, it is found that mixing thereof within at least this range is suitable.

As described above, since it was found that the desired hardness can be obtained by mixing only about 1.0% by weight of lithium carbonate, in Examples 5 to 7, about 1.0% by weight of lithium carbonate was mixed but the kind of lithium carbonate was changed.

Example 5

The molding material in Example 5 was manufactured by sufficiently stirring the following components.

Aggregate (casting sand): about 70.5% by weight of Lunamos manufactured by Kao Quaker Co., Ltd.

Alumina cement in powder precursor: about 27.0% by weight of Asahi Alumina Cement No. 1

Lithium carbonate in powder precursor: about 1.0% by weight of highly pure lithium carbonate (4N, purity of 99.99%) manufactured by Honjo Chemical Corporation Adjusting agent: about 1.5% by weight of Gohsenol manufactured by Nippon Synthetic Chemical Industry Co., Ltd.

Water was dropped in the same manner as in Example 1 and the hardening effect was verified, then the following results were obtained.

Time of water permeation into molding material: about 60 seconds

Hardening start time of molding material: about 2.5 minutes

Hardness after hardening start of molding material:
 5 minutes later; about 80
 10 minutes later; about 90
 30 minutes later; about 95

Weight of hardened portion of molding material: about 31.5 g

Thickness of hardened portion of molding material: about 5.4 mm

Volume of hardened portion of molding material: about 13.1 cm$^3$

The molding material in Example 5 takes about 2.5 minutes until hardening start and can achieve a hardness of about 90 after 10 minutes from the start, and the weight, thickness, and volume of the hardened portion of the molding material satisfy the above corresponding requirements, so that the material can be evaluated to be a good molding material.

When the molding material in Example 5 and the molding material in Comparative Example 1 are compared, it is found that, in the molding material in Example 5, the hardening start time of the molding material after the dropping of water is shortened to about ⅐ and the time for obtaining a hardness of about 90 is shortened to about ⅑.

Example 6

The molding material in Example 6 was manufactured by sufficiently stirring the following components.

Aggregate (casting sand): about 70.5% by weight of Lunamos manufactured by Kao Quaker Co., Ltd.

Alumina cement in powder precursor: about 27.0% by weight of Asahi Alumina Cement No. 1

Lithium carbonate in powder precursor: about 1.0% by weight of highly pure lithium carbonate (industrial one-3633: purity of 99.60%) manufactured by Honjo Chemical Corporation Adjusting agent: about 1.5% by weight of Gohsenol manufactured by Nippon Synthetic Chemical Industry Co., Ltd.

Water was dropped in the same manner as in Example 1 and the hardening effect was verified, then the following results were obtained.

Time of water permeation into molding material: about 100 seconds

Hardening start time of molding material: about 2.8 minutes

Hardness after hardening start of molding material:
 5 minutes later; about 73
 10 minutes later; about 85
 30 minutes later; about 95

Weight of hardened portion of molding material: about 29.0 g

Thickness of hardened portion of molding material: about 5.2 mm

Volume of hardened portion of molding material: about 11.8 cm$^3$

The molding material in Example 6 takes about 2.8 minutes until hardening start and can achieve a hardness of about 90 probably after 20 minutes from the start, and the weight, thickness, and volume of the hardened portion of the molding material satisfy the above corresponding requirements, so that the material can be evaluated to be a good molding material.

When the molding material in Example 6 and the molding material in Comparative Example 1 are compared, it is found that, in the molding material in Example 6, the hardening start time of the molding material after the dropping of water is shortened to about 1/6 and the time for obtaining a hardness of about 90 is shortened to about 1/5.

Example 7

The molding material in Example 7 was manufactured by sufficiently stirring the following components.

Aggregate (casting sand): about 70.5% by weight of Lunamos manufactured by Kao Quaker Co., Ltd.

Alumina cement in powder precursor: about 27.0% by weight of Asahi Alumina Cement No. 1

Lithium carbonate in powder precursor: about 1.0% by weight of highly pure lithium carbonate (UF-300: purity of 99.60%) manufactured by Honjo Chemical Corporation Adjusting agent: about 1.5% by weight of Gohsenol manufactured by Nippon Synthetic Chemical Industry Co., Ltd.

Water was dropped in the same manner as in Example 1 and the hardening effect was verified, then the following results were obtained.

Time of water permeation into molding material: about 60 seconds

Hardening start time of molding material: about 2.0 minutes

Hardness after hardening start of molding material:
5 minutes later; about 90
10 minutes later; about 95
30 minutes later; about 95

Weight of hardened portion of molding material: about 31.5 g

Thickness of hardened portion of molding material: about 5.0 mm

Volume of hardened portion of molding material: about 13.1 cm$^3$

The molding material in Example 7 takes about 2.0 minutes until hardening start and can achieve a hardness of about 90 after 5 minutes from the start, and the weight, thickness, and volume of the hardened portion of the molding material satisfy the above corresponding requirements, so that the material can be evaluated to be a good molding material.

When the molding material in Example 7 and the molding material in Comparative Example 1 are compared, it is found that, in the molding material in Example 7, the hardening start time of the molding material after the dropping of water is shortened to about 1/9 and the time for obtaining a hardness of about 90 is shortened to about 1/18.

When the consideration results of the hardening effects of Examples 5 to 7 are summarized, it is found that the time required for the hardness to reach, for example, about 90 after the hardening start of the molding material varies depending on the kind of lithium carbonate.

However, with regard to the kind of lithium carbonate, there are differences in fine powder/granules, particle diameter, and the like, but the preferred kind thereof is not always clear only from the results of the hardening effects. Nevertheless, it can be said that the molding material in Example 7 is most excellent in terms of the hardening start time of the molding material and the hardness after the hardening start of the molding material.

Therefore, in Examples 8 to 11 to be described later, the ratio of casting sand to lithium carbonate is changed, while using the high purity lithium carbonate (UF-300: purity of 99.60%) manufactured by Honjo Chemical Corporation used in Example 7.

Incidentally, using the molding material in Example 7, a molding experiment was performed using Spectrum Z310-3D Printer manufactured by 3D Systems. Specifically, compressive strength was measured every specific time after completion of the molding time, and the degree of quick hardening resulting from the lithium carbonate blending was confirmed.

First, in the molding material in Example 7, at the time when the curing time after completion of the molding time is about 3.5 hours, the pressure strength of the molded article was confirmed to be 9.3 kg$^f$/cm$^2$ which far exceeded 7.0 kg$^f$/cm$^2$ that is considered to be sufficient as the molded article in the field of casting.

Thereafter, when the pressure strength was measured at each time point of the curing time after completion of the molding time of about 4.0 hours, about 5.0 hours, about 6.0 hours, about 7.0 hours, and about 24.0 hours, the strength was found to be about 10.1 kg$^f$/cm$^2$, about 9.9 kg$^f$/cm$^2$, about 9.2 kg$^f$/cm$^2$, about 9.8 kg$^f$/cm$^2$, and about 10.0 kg$^f$/cm$^2$, respectively.

Here, since the molding material in Comparative Example 1 required a curing time of about 10 hours after completion of the molding time for obtaining a pressure strength of about 9.3 kg$^f$/cm$^2$, it was found that the molding material in Example 7 only required about 1/3 of the time, as compared with Comparative Example 1, for obtaining the same level of pressure strength and thus quick hardening time was attained.

Example 8

The molding material in Example 8 was manufactured by sufficiently stirring the following components.

Aggregate (casting sand): about 83.0% by weight of FINE-Bz manufactured by AGC Ceramics Co., Ltd.

Alumina cement in powder precursor: about 15.0% by weight of Asahi Alumina Cement No. 1

Lithium carbonate in powder precursor: about 0.5% by weight of highly pure lithium carbonate (UF-300: purity of 99.60%) manufactured by Honjo Chemical Corporation Adjusting agent: about 1.5% by weight of Gohsenol manufactured by Nippon Synthetic Chemical Industry Co., Ltd.

Water was dropped in the same manner as in Example 1 and the hardening effect was verified, then the following results were obtained.

Time of water permeation into molding material: about 37 seconds

Hardening start time of molding material: about 5.8 minutes

Hardness after hardening start of molding material:
8 minutes later; about 90
10 minutes later; about 90
12 minutes later; about 95
30 minutes later; about 95

Weight of hardened portion of molding material: about 26.3 g

Thickness of hardened portion of molding material: about 6.0 mm

Volume of hardened portion of molding material: about 12.7 cm$^3$

The molding material in Example 8 takes about 5.8 minutes until hardening start and can achieve a hardness of about 90 after 8 minutes from the start, and the weight, thickness, and volume of the hardened portion of the molding material satisfy the above corresponding requirements, so that the material can be evaluated to be a good molding material.

When the molding material in Example 8 and the molding material in Comparative Example 1 are compared, it is found that, in the molding material in Example 8, the hardening start time of the molding material after the dropping of water is shortened to about ⅓ and the time for obtaining a hardness of about 90 is shortened to about 1/11.

Comparative Example 2

The molding material in Comparative Example 2 was manufactured by sufficiently stirring the following components.

Aggregate (casting sand): about 83.5% by weight of FINE-Bz manufactured by AGC Ceramics Co., Ltd.

Alumina cement in powder precursor: about 15.0% by weight of Asahi Alumina Cement No. 1

Lithium carbonate in powder precursor: none

Adjusting agent: about 1.5% by weight of Gohsenol manufactured by Nippon Synthetic Chemical Industry Co., Ltd.

Water was dropped in the same manner as in Example 1 and the hardening effect was verified, then the following results were obtained.

Time of water permeation into molding material: about 43 seconds

Hardening start time of molding material: about 23.6 minutes

Hardness after hardening start of molding material:
60 minutes later; about 90

Weight of hardened portion of molding material: about 25.1 g

Thickness of hardened portion of molding material: about 6.4 mm

Volume of hardened portion of molding material: about 11.8 cm$^3$

When the molding material in Example 8 and the molding material in Comparative Example 2 are compared, it is found that, in the molding material in Example 8, the hardening start time of the molding material after the dropping of water is shortened to about ¼ and the time for obtaining a hardness of about 90 is shortened to about ⅛.

Example 9

The molding material in Example 9 is manufactured while reducing the amount of the aggregate by about 0.5% by weight and increasing the amount of lithium carbonate in the powder precursor by about 0.5% by weight, as compared with the molding material in Example 8. The other conditions are the same as in the case of Example 8.

Water was dropped in the same manner as in Example 1 and the hardening effect was verified, then the following results were obtained.

Time of water permeation into molding material: about 30 seconds

Hardening start time of molding material: about 2.9 minutes

Hardness after hardening start of molding material:
5 minutes later; about 90
8 minutes later; about 90
10 minutes later; about 95
12 minutes later; about 95
30 minutes later; about 95

Weight of hardened portion of molding material: about 27.3 g

Thickness of hardened portion of molding material: about 6.2 mm

Volume of hardened portion of molding material: about 13.1 cm$^3$

The material molding material in Example 9 takes about 2.9 minutes until hardening start and can achieve a hardness of about 90 after 5 minutes from the start, and the weight, thickness, and volume of the hardened portion of the molding material satisfy the above corresponding requirements, so that the material can be evaluated to be a good molding material.

Moreover, when the molding material in Example 9 and the molding material in Comparative Example 1 are compared, it is found that, in the molding material in Example 9, the hardening start time of the molding material after the dropping of water is shortened to about ⅙ and the time for obtaining a hardness of about 90 is shortened to about 1/18.

Moreover, when the molding material in Example 9 and the molding material in Comparative Example 2 are compared, it is found that, in the molding material in Example 9, the hardening start time of the molding material after the dropping of water is shortened to about ⅛ and the time for obtaining a hardness of about 90 is shortened to about 1/12.

Example 10

The molding material in Example 10 is manufactured while reducing the amount of the aggregate by about 1.0% by weight and increasing the amount of lithium carbonate in the powder precursor by about 1.0% by weight, as compared with the molding material in Example 8. The other conditions are the same as in the case of Example 8.

Water was dropped in the same manner as in Example 1 and the hardening effect was verified, then the following results were obtained.

Time of water permeation into molding material: about 28 seconds

Hardening start time of molding material: about 2.5 minutes

Hardness after hardening start of molding material:
5 minutes later; about 90
8 minutes later; about 90
10 minutes later; about 95
12 minutes later; about 95
30 minutes later; about 95

Weight of hardened portion of molding material: about 25.7 g

Thickness of hardened portion of molding material: about 6.6 mm

Volume of hardened portion of molding material: about 12.3 cm$^3$

The molding material in Example 10 takes about 2.5 minutes until hardening start and can achieve a hardness of about 90 after 5 minutes from the start, and the weight, thickness, and volume of the hardened portion of the molding material satisfy the above corresponding requirements, so that the material can be evaluated to be a good molding material.

Moreover, when the molding material in Example 10 and the molding material in Comparative Example 1 are compared, it is found that, in the molding material in Example 10, the hardening start time of the molding material after the dropping of water is shortened to about 1/7 and the time for obtaining a hardness of about 90 is shortened to about 1/18.

Moreover, when the molding material in Example 10 and the molding material in Comparative Example 2 are compared, it is found that, in the molding material in Example 10, the hardening start time of the molding material after the dropping of water is shortened to about 1/9 and the time for obtaining a hardness of about 90 is shortened to about 1/12.

Example 11

The molding material in Example 11 is manufactured while reducing the amount of the aggregate by about 1.5% by weight and increasing the amount of lithium carbonate in the powder precursor by about 1.5% by weight, as compared with the molding material in Example 8. The other conditions are the same as in the case of Example 8.

Water was dropped in the same manner as in Example 1 and the hardening effect was verified, then the following results were obtained.

Time of water permeation into molding material: about 26 seconds

Hardening start time of molding material: about 2.4 minutes

Hardness after hardening start of molding material:
5 minutes later; about 90
8 minutes later; about 90
10 minutes later; about 95
12 minutes later; about 95
30 minutes later; about 95

Weight of hardened portion of molding material: about 26.8 g

Thickness of hardened portion of molding material: about 6.4 mm

Volume of hardened portion of molding material: about 12.8 cm$^3$

The molding material in Example 11 takes about 2.4 minutes until hardening start and can achieve a hardness of about 90 after 5 minutes from the start, and the weight, thickness, and volume of the hardened portion of the molding material satisfy the above corresponding requirements, so that the material can be evaluated to be a good molding material.

Moreover, when the molding material in Example 11 and the molding material in Comparative Example 1 are compared, it is found that, in the molding material in Example 11, the hardening start time of the molding material after the dropping of water is shortened to about 1/7 and the time for obtaining a hardness of about 90 is shortened to about 1/18.

Moreover, when the molding material in Example 11 and the molding material in Comparative Example 2 are compared, it is found that, in the molding material in Example 11, the hardening start time of the molding material after the dropping of water is shortened to about 1/10 and the time for obtaining a hardness of about 90 is shortened to about 1/12.

When the consideration results of the hardening effects of Examples 8 to 11 are summarized, it is found that the hardening rate of the molding material does not depend much on the mixing amount of lithium carbonate. On the other hand, the hardening start time of the molding material is shortened according to the mixing amount of lithium carbonate, and it is found that there is a breakthrough between 0.5% by weight and 1.0% by weight of lithium carbonate. However, since the requirements such as the weight of the hardened portion of the molding material are satisfied in all of Examples 8 to 11, it is found that the mixing amount of lithium carbonate is sufficiently 0.5% by weight or more. Moreover, there is no particular tendency to cause inconveniences by increasing the mixing ratio of lithium carbonate, so that it is allowable to control the amount to, for example, about 10.0% by weight relative to the whole molding material.

Example 12

The molding material in Example 12 is manufactured while increasing the amount of the aggregate by about 0.5% by weight and reducing the amount of the adjusting agent in the powder precursor by about 0.5% by weight, as compared with the molding material in Example 8. The other conditions are the same as in the case of Example 8.

Water was dropped in the same manner as in Example 1 and the hardening effect was verified, then the following results were obtained.

Time of water permeation into molding material: about 14 seconds

Hardening start time of molding material: about 2.8 minutes

Hardness after hardening start of molding material:
5 minutes later; about 80
8 minutes later; about 85
10 minutes later; about 90
30 minutes later; about 95

Weight of hardened portion of molding material: about 34.0 g

Thickness of hardened portion of molding material: about 7.3 mm

Volume of hardened portion of molding material: about 15.7 cm$^3$

The molding material in Example 12 takes about 2.8 minutes until hardening start and can achieve a hardness of about 90 after 10 minutes from the start, and the weight, thickness, and volume of the hardened portion of the molding material satisfy the above corresponding requirements, so that the material can be evaluated to be a good molding material.

Moreover, when the molding material in Example 12 and the molding material in Comparative Example 1 are compared, it is found that, in the molding material in Example 12, the hardening start time of the molding material after the dropping of water is shortened to about 1/6 and the time for obtaining a hardness of about 90 is shortened to about 1/9.

Moreover, when the molding material in Example 12 and the molding material in Comparative Example 2 are compared, it is found that, in the molding material in Example 12, the hardening start time of the molding material after the dropping of water is shortened to about 1/8 and the time for obtaining a hardness of about 90 is shortened to about 1/6.

A molding material was manufactured while increasing the amount of the aggregate by about 1.0% by weight and reducing the amount of the adjusting agent in the powder precursor by about 1.0% by weight as compared with the molding material in Example 8, then the thickness of the hardened portion of the molding material was about 9.8 mm, and it was found that the above corresponding requirement was not satisfied. Moreover, when the amount of the adjusting agent was zero, the thickness of the hardened portion of the molding material was about 10.0 mm.

Example 13

The molding material in Example 13 was manufactured by sufficiently stirring the following components.

Aggregate (casting sand): about 93.9% by weight of FINE-Bz manufactured by AGC Ceramics Co., Ltd.

About 5.0% by weight of high alumina cement ($Al_2O_3$: about 70% by weight, and CaO: about 28% by weight) in powder precursor Lithium carbonate in powder precursor: about 0.1% by weight of lithium carbonate (special grade, 500 g) manufactured by Kishida Chemical Co., Ltd.

Adjusting agent: about 1.0% by weight of Gohsenol manufactured by Nippon Synthetic Chemical Industry Co., Ltd.

Example 14

The molding material in Example 14 was manufactured by sufficiently stirring the following components.

Aggregate (casting sand): about 90.9% by weight of FINE-Bz manufactured by AGC Ceramics Co., Ltd. Co., Ltd.

About 8.0% by weight of high alumina cement ($Al_2O_3$: about 70% by weight, and CaO: about 28% by weight) in powder precursor Lithium carbonate in powder precursor: about 0.1% by weight of lithium carbonate (special grade, 500 g) manufactured by Kishida Chemical Co., Ltd.

Adjusting agent: about 1.0% by weight of Gohsenol manufactured by Nippon Synthetic Chemical Industry Co., Ltd.

Example 15

The molding material in Example 15 was manufactured by sufficiently stirring the following components.

Aggregate (casting sand): about 86.9% by weight of FINE-Bz manufactured by AGC Ceramics Co., Ltd.

About 12.0% by weight of high alumina cement ($Al_2O_3$: about 70% by weight, and CaO: about 28% by weight) in powder precursor Lithium carbonate in powder precursor: about 0.1% by weight of lithium carbonate (special grade 500 g) manufactured by Kishida Chemical Co., Ltd.

Adjusting agent: about 1.0% by weight of Gohsenol manufactured by Nippon Synthetic Chemical Industry Co., Ltd.

Example 16

The molding material in Example 16 was manufactured by sufficiently stirring the following components.

Aggregate (casting sand): about 83.9% by weight of FINE-Bz manufactured by AGC Ceramics Co., Ltd.

About 15.0% by weight of high alumina cement ($Al_2O_3$: about 70% by weight, and CaO: about 28% by weight) in powder precursor Lithium carbonate in powder precursor: about 0.1% by weight of lithium carbonate (special grade, 500 g) manufactured by Kishida Chemical Co., Ltd.

Adjusting agent: about 1.0% by weight of Gohsenol manufactured by Nippon Synthetic Chemical Industry Co., Ltd.

When the molding materials in Examples 13 to 16 were similarly tested, it was confirmed that they could be also suitably used.

While the present invention is described in detail and with reference to specific embodiments thereof, it will be apparent to one skilled in the art that various changes and modifications can be made therein without departing from the spirit and scope thereof.

The present application is based on Japanese Patent Application No. 2017-099883 filed on May 19, 2017, the contents of which are incorporated herein by reference.

The invention claimed is:

1. A molding material in a powder-fixing lamination method, comprising:
   an aggregate, which is a casting sand; and
   a powdery precursor of a binder that binds the aggregate mutually, the powdery precursor comprising a hardening component and a hardening accelerating component,
   wherein the casting sand is composed of spherical refractory particles comprising, as chemical components: 75 to 97% by weight of at least one of $ZrO_2$ and $Al_2O_3$; and 2 to 25% by weight of $SiO_2$,
   the hardening component is included in an amount of 18% by weight or less relative to a weight of the molding material, and
   the molding material has an average diameter of 10 μm to 100 μm.

2. The molding material according to claim 1, wherein the hardening accelerating component comprises a lithium salt.

3. The molding material according to claim 1, wherein the hardening component comprises at least one selected from the group consisting of a portland cement, an alumina cement, a quick-hardening cement, a phosphate cement, a water glass, a phosphate compound, a metal alkoxide material, a sulfate, and a chloride including a polyaluminum chloride.

4. The molding material according to claim 1, wherein the powdery precursor further comprises a functional component, which comprises at least one selected from the group consisting of a silica fume, a magnesia ultrafine powder and a heat-resistant resin.

5. A composition, comprising:
   the molding material according to claim 1; and
   a functional agent, which is capable of converting the powdery precursor into the binder.

6. A molded product manufactured using the molding material according to claim 1.

7. A method for manufacturing a product, comprising:
   producing a molded product using the molding material according to claim 1; and
   manufacturing the product using the molded product as a mold.

8. The molding material according to claim 1, wherein the hardening accelerating component comprises a lithium salt, and the lithium salt is at least one selected from the group consisting of lithium carbonate, lithium hydrogen carbonate, lithium nitrate, lithium sulfate, lithium phosphate, and lithium oxalate.

9. The molding material according to claim 1, wherein the hardening component is included in an amount of 5.0% by weight or more relative to the weight of the molding material.

10. The molding material according to claim 1, wherein the hardening accelerating component is included in an amount of 0.05% to 6% by weight relative to the weight of the molding material.

11. The molding material according to claim 1,
wherein the hardening component comprises an alumina cement,
the hardening accelerating component comprises a lithium salt, and
a ratio of the casting sand:a total of the alumina cement and the lithium salt is 65% to 75% by weight:25 to 35% by weight.

12. The molding material according to claim 1, wherein the aggregate is included in an amount of 70% by weight or more relative to the weight of the molding material.

13. The molding material according to claim 1, consisting of:
the aggregate;
the powdery precursor consisting of the hardening component and the hardening accelerating component;
optionally adjusting agent, which is at least one selected from the group consisting of sodium silicate, polyvinyl alcohol (PVA), carboxymethyl cellulose (CMC), and dextrin; and
optionally a functional component, which is selected from the group consisting of a silica fume, a magnesia ultrafine powder, and a heat-resistant resin,
wherein the hardening component consists of at least one selected from the group consisting of a portland cement, an alumina cement, a quick-hardening cement, a phosphate cement, a water glass, a phosphate compound, a metal alkoxide material, a sulfate, and a chloride, and
the hardening accelerating component consists of at least one lithium salt selected from the group consisting of lithium carbonate, lithium hydrogen carbonate, lithium nitrate, lithium sulfate, lithium phosphate, and lithium oxalate.

* * * * *